WILLIAM H. McPHERSON.
Improvement in Bedstead Fastenings.
No. 121,726.            Patented Dec. 12, 1871.
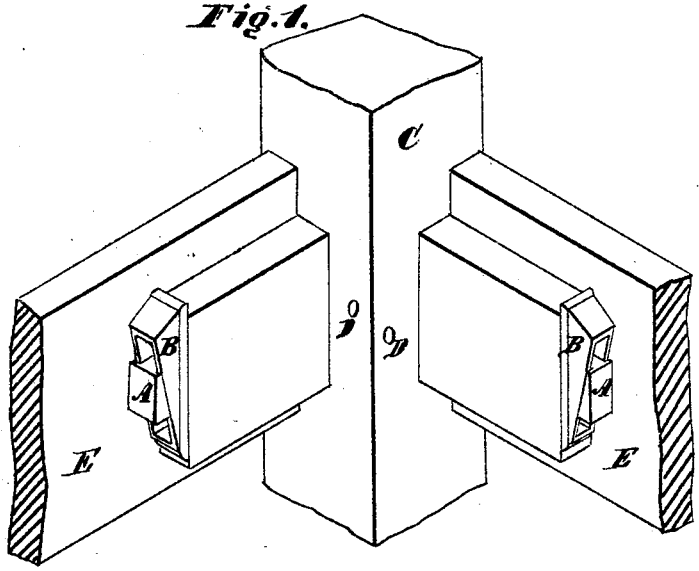
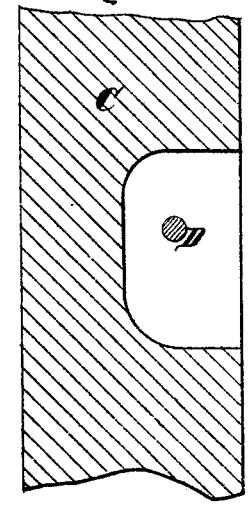
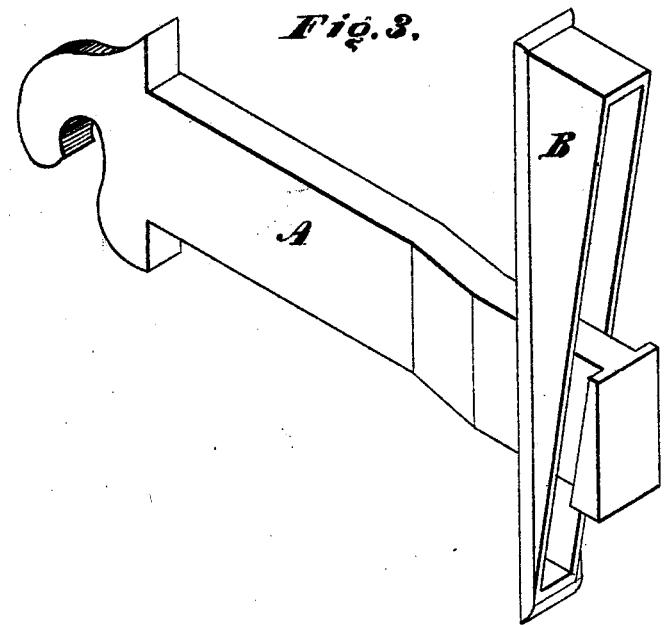
WITNESSES.           INVENTOR.
Peter Cooper.
S. E. Gilbert Jr.
William H. McPherson

UNITED STATES PATENT OFFICE.

WILLIAM H. McPHERSON, OF NASHVILLE, TENNESSEE, ASSIGNOR TO JAMES E. STACY AND MERRILL G. PHILLIPS, OF SAME PLACE.

IMPROVEMENT IN BEDSTEAD-FASTENINGS.

Specification forming part of Letters Patent No. 121,726, dated December 12, 1871.

*To all whom it may concern:*

Be it known that I, WILLIAM H. MCPHERSON, of Nashville, in the county of Davidson and State of Tennessee, have invented a new and useful Improvement in Bedstead-Fastening, of which the following is a specification:

My invention consists in attaching the rail of a bedstead to the post by use of a flat iron bolt with an irregular hook-shaped head at one end adapted to occupy a segmental cavity in the post, in which is a pin, over which it hooks. The other end of this bolt has a wedge-shaped protuberance that works on a slotted wedge, through which works the flat iron bolt, and with the bolt forms a cheap and durable bedstead-fastener, combining great strength and durability.

Figure 1 is a perspective view of a corner of a bedstead with the fastener inside. Fig. 2 is a sectional view of the bedstead post. Fig. 3 is a view of a hooked bolt-wedge, &c.

A is a flat iron bolt with an irregular hooked head at one end and wedged protuberance at the other. This bolt works in a cavity in block F, attached to the side of the bed-rail, forming with its hooked head the tenon members of the fastening. This bolt is governed by wedge B, a slotted iron wedge that works on the bolt between the wedged protuberance and the block F, and is used for tightening the rail to the post when the hooked end of the bolt A has entered the post mortise and been hooked over the iron pin D. The wedge B driven home, the whole thing, drawn tight, is held fast together.

I claim as my invention—

As a bedstead-fastener, the combination of the hook A and slotted wedge B, both constructed, arranged, and used as specified.

Given this 14th day of November, 1871.

WILLIAM H. McPHERSON.

Witnesses:
MINNA H. GLASIRE,
MINERVA MARSHALL.

(62)